June 12, 1945.    B. M. PETERS    2,377,959
AGRICULTURAL CART
Filed Nov. 23, 1942
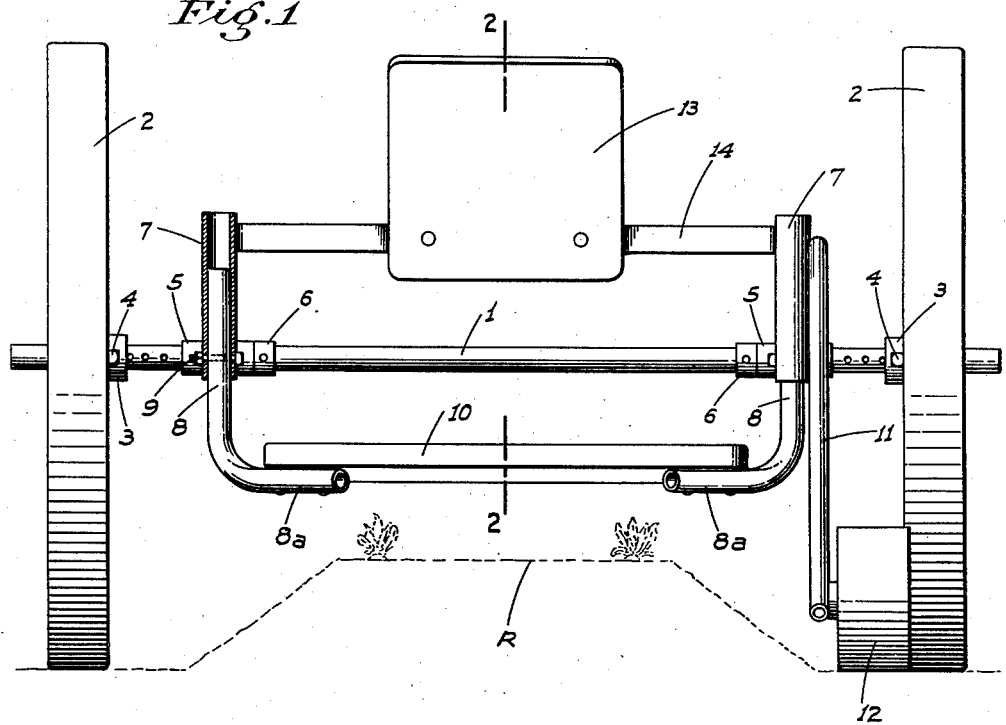
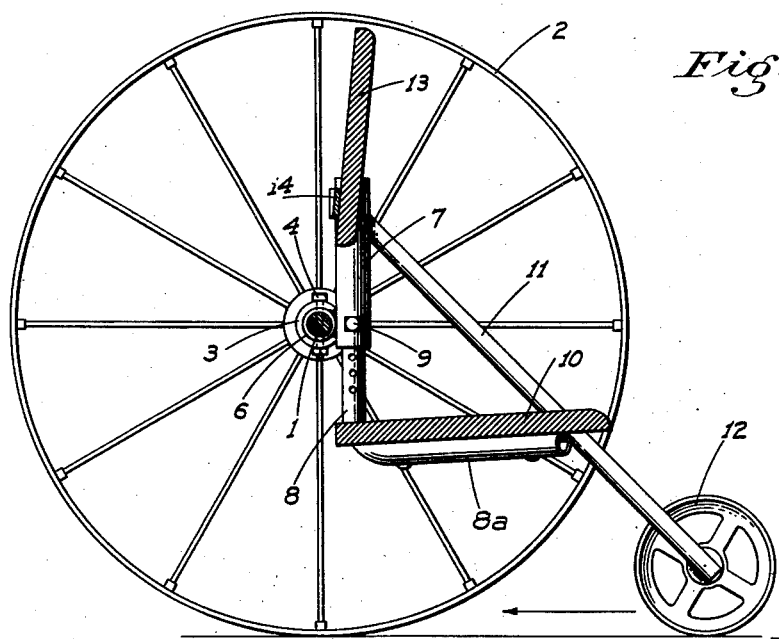
INVENTOR
Byron M. Peters
BY
ATTYS Patented June 12, 1945

2,377,959

UNITED STATES PATENT OFFICE 2,377,959

AGRICULTURAL CART

Byron M. Peters, Lathrop, Calif.

Application November 23, 1942, Serial No. 466,621

4 Claims. (Cl. 280—62)

The present invention relates in general to an agricultural cart, and in particular the invention is directed to, and it is the principal object to provide, a field worker's seat cart which comprises a seat supported relatively close to the ground by spaced ground engaging wheels; said seat cart being arranged to straddle one row of a row-crop whereby a field worker seated on the cart may easily and conveniently reach the row for planting, thinning, cultivating, or harvesting of the crop in said row, without the necessity of continuously stooping over, or kneeling on the ground while performing the operations.

A further object of this invention is to provide a field worker's seat cart which is constructed so that the tread of the cart, as well as the elevation of the seat above the ground, may be adjusted to accommodate the cart to the width and height respectively of the row upon which the work is to be done.

A still further object of the invention is to provide a field worker's seat cart which includes, in combination with a pair of transversely spaced, ground engaging wheels secured on an axle, a seat assembly disposed between the wheels and suspended from the axle in relatively rotatable relation thereto, and a tilt control wheel connected in rigid relation to the seat assembly and riding on the ground at a point spaced from said seat assembly lengthwise of the direction of travel whereby to stabilize the seat assembly when in use.

An additional object of the invention is to provide a field worker's seat cart as in the preceding paragraph in which the seat assembly and the tilt control wheel are so disposed that the worker, when desiring to move the cart, leans back slightly in the seat and against the back thereof, which tends to slightly raise said tilt control wheel. Thereafter the worker, who is seated on the cart with his back facing the direction of travel, pushes with his feet on the ground, causing the cart to advance along the row.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front elevation of my field worker's seat cart.

Figure 2 is a cross section on line 2—2 of Fig. 1.

Referring now more particularly to the characters of reference on the drawing, the cart comprises a horizontal axle 1 supported at its ends by substantial diameter ground engaging wheels 2 of light construction and which have a relatively wide face; the wheels 2 being formed with hubs 3 secured to the axle for adjustment axially thereof by means of cross pins or bolts 4. By virtue of this adjustability of the wheels 2 the tread of the cart can be varied dependent upon the width of the row R which the cart is adapted to straddle.

The axle 1, between the wheels 2, supports a seat assembly which comprises the following:

A pair of relatively wide spaced sleeves 5 are disposed on shaft 1 in relatively rotatable relation; said sleeves being held against axial displacement by means of fixed collars 6 secured on the shaft at inside ends of the sleeves 5.

A pair of substantially vertical elongated sleeves 7 are fixedly secured on one side and adjacent their lower end to corresponding sleeves 5 at one side of the latter, whereby the sleeves are disposed in offset relation to the vertical plane of axle 1 and in a direction opposite to the intended direction of travel of the cart, as indicated by the arrow in Fig. 2.

Tubular seat supporting arms 8 telescope into the sleeves 7 from the lower end of the latter, and are secured therein for vertical adjustment by means of removable cross bolts 9. Some distance below the sleeves 7 the arms 8 are bent to form substantially horizontal extensions 8a which project in generally converging relation; a horizontal seat 10 extending between and being supported by and secured on said arm extensions 8a. As shown, said seat 10 is disposed parallel in offset relation relative to the axle 1 in a direction opposite the direction of travel, whereby the above described seat assembly normally tends to rotate about the axle and tilt downwardly at its forward edge.

To prevent this downward tilt, I provide a rigid arm 11 which is fixedly secured to one of the sleeves 7 laterally out from the adjacent arm 8, and thence extends at a downward slope toward the ground and in a direction opposite to the direction of operating travel of the cart. At its lower end the arm 11 is fitted with a ground-engaging element to prevent digging in, such as a runner or relatively small-diameter wheel 12.

The seat assembly also includes a back 13 fixed on a cross bar 14 which extends between the upper ends of sleeves 7, said back likewise being somewhat offset relative to the axle 1 in the same direction as the offset of seat 10, and further said back is disposed with a forward slope upwardly from its lower edge relative to the seat.

In use the wheels 2 are adjusted to proper tread for a given row R, and the arms 8 are adjusted in sleeves 7 to dispose the seat 10 adjacent but clear of the top of said row, or so as to suit the convenience of the individual user. The field worker then sits on the seat assembly with his legs on opposite sides of the row, and can conveniently work with his hands on the plants in the adjacent portion of said row.

As is apparent the tilt control arm and wheel 12 maintain the seat assembly in the desired position. When the worker desires to move the cart, it is only necessary to lean back slightly against the back 13, which tends to swing the seat assembly, together with the arm 11 and wheel 12 slightly upwardly. The worker then digs his heels into the ground on opposite sides of the row and pushes with his legs, causing the cart to advance along the row to the desired extent.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A field worker's seat cart comprising a pair of spaced ground engaging wheels, an axle on which the wheels are mounted, a pair of spaced sleeves rotatably mounted on the axle, said sleeves being held against axial displacement, another pair of spaced sleeves disposed in upstanding position and secured on said axle mounted sleeves with the lower ends of said upstanding sleeves open, a seat assembly including a pair of arms projecting into said upstanding sleeves from below, means securing the arms in said upstanding sleeves; the seat being horizontally offset in one direction relative to the axle, a seat back secured to said upstanding sleeves and disposed therebetween above the seat, and means including a ground engaging element arranged to prevent downward tilting of the seat.

2. A field worker's seat cart comprising a pair of spaced ground engaging wheels, an axle on which the wheels are mounted, a pair of spaced sleeves rotatably mounted on the axle, said sleeves being held against axial displacement, another pair of spaced sleeves disposed in upstanding position and secured on said axle mounted sleeves with the lower ends of said upstanding sleeves open, a seat assembly including a pair of arms projecting into said upstanding sleeves from below, means securing the arms in said upstanding sleeves; the seat being horizontally offset in one direction relative to the axle, a seat back secured to said upstanding sleeves and disposed therebetween above the seat and adjacent the axle, and means including a ground engaging element arranged to prevent downward tilting of the seat, said last named means comprising a rigid arm fixed at one end on one of the upstanding sleeves and extending therefrom in said one direction at a downward slope, and a ground engaging wheel on the lower end of said rigid arm.

3. A field worker's seat cart comprising a pair of spaced ground engaging wheels, an axle on which the wheels are mounted, a pair of spaced sleeves rotatably mounted on the axle, said sleeves being held against axial displacement, another pair of spaced sleeves disposed in upstanding position and secured on said axle mounted sleeves with the lower ends of said upstanding sleeves open, a seat assembly including a pair of arms projecting into said upstanding sleeves from below, means securing the arms in said sleeves, a bar secured to and extending between said upstanding sleeves above the seat, and a seat back fixed on said bar intermediate its ends.

4. An agricultural cart consisting of an axle, a pair of wheels journaled on the axle and the axle being turnable relative to the wheels, a seat fixed to the axle and being offset in its entirety to one side of the axle whereby the weight of the seat constantly tends to turn the axle and tip the seat towards the ground on that side of the axle, said seat facing in a direction opposite that in which the cart is intended to be moved, and means to limit such tipping action of the seat; said last named means comprising a rearwardly projecting arm fixed to the seat to one side thereof, and a ground engaging element at the outer end of the arm.

BYRON M. PETERS.